United States Patent [19]
DuBois et al.

[11] 3,823,733
[45] July 16, 1974

[54] DIAPHRAGM VALVE

[75] Inventors: Chester DuBois, Zion; Paul R. Hunt, Lindenhurst, both of Ill.

[73] Assignee: Outboard Marine Corporation, Waukegan, Ill.

[22] Filed: Jan. 18, 1973

[21] Appl. No.: 324,849

Related U.S. Application Data

[62] Division of Ser. No. 85,954, Nov. 2, 1970, Pat. No. 3,746,036.

[52] U.S. Cl. .............................. 137/496, 251/61.1
[51] Int. Cl. ............................................. F16k 15/14
[58] Field of Search ........ 137/496, 510; 251/45, 46, 251/24, 38, 40, 61.1

[56] References Cited
UNITED STATES PATENTS

| | | | |
|---|---|---|---|
| 3,319,926 | 5/1967 | Boger | 251/61.1 |
| 3,518,977 | 7/1970 | Smith | 251/61.1 X |
| 3,534,768 | 10/1970 | Powell | 137/496 |
| 3,616,783 | 11/1971 | La Masters | 251/61.1 X |

Primary Examiner—Henry T. Klinksiek
Assistant Examiner—Robert J. Miller
Attorney, Agent, or Firm—R. Warren Comstock

[57] ABSTRACT

Disclosed herein is an improved valve for regulating the flow of fluids. The valve includes a housing defining, in part, a flow passageway having a port surrounded by a valve seat. A diaphragm is mounted within the housing and assists in completing the flow passageway. The diaphragm is movable between a first position to cause closing of the port and a second position to cause opening of the port. A spring having an end with a diameter larger than the port is operatively engaged with the diaphragm urging the diaphragm to close the port. A suction force operates on the same side of the diaphragm as the spring creating a pressure differential on opposite sides of the diaphragm. The pressure differential is effective to overcome the action of the spring, thereby displacing the diaphragm to an open position and allowing flow of fluid through the port.

12 Claims, 4 Drawing Figures

DIAPHRAGM VALVE

RELATED APPLICATIONS

This application is a divisional continuation of U.S. Pat. application Ser. No. 85,954, filed Nov. 2, 1970 now U.S. Pat. No. 3,746,036.

BACKGROUND OF INVENTION

The invention relates to diaphragm valves adapted for a number of different uses such as a vent valve in the cap of a portable fuel tank or an anti-siphon valve in a fuel system. The application of the diaphragm valve as a vent valve for a portable fuel tank allows the entry of air into the tank as fuel is withdrawn, as well as preventing the escape of dangerous fuel vapors from the tank. The application of the diaphragm valve as an anti-siphon valve minimizes the possibility of spillage of liquid fuel under all normal operational or contemplated failure conditions. In both of these uses the invention diminishes the effects of pollution and substantially reduces the chances of fire or explosion. In addition, anti-siphon protection is now required by the Boating Industry Association for boat certification.

One example of a prior diaphragm valve construction is disclosed in the U.S. Powell Pat. No. 3,534,768 issued Oct. 20, 1970. In the Powell construction, the diaphragm is supported at its periphery in a plane below the valve seat so as to normally engage the outer lip of the valve seat and place the diaphragm in an inherent tension condition. In addition, the Powell patent discloses use of a spring which is engaged with the diaphragm inwardly of the valve seat opening so as to further maintain the diaphragm in sealing engagement with the valve seat.

SUMMARY OF THE INVENTION

The invention provides a diaphragm valve including a biasing spring with an end which operatively engages a diaphragm and which has a diameter larger than the valve seat relative to which the diaphragm is movable. Also in accordance with the invention, the diaphragm is preferably supported on the housing in a plane spaced above the valve seat and the spring is designed so that, in the absence of an upstream and downstream pressure differential, a portion of the diaphragm around the valve seat is located at least slightly below the valve seat, so as thereby to afford a reliable seal.

In addition, in further accordance with the invention, there is provided between the diaphragm and the spring a support pad or member which, in effect, constitutes an extension of the spring and which preferably includes a dished central portion which extends into the adjacent end of the spring from adjacent to the lowermost coil and a conical portion which extends radially outwardly from the central portion and axially away from the valve seat. As a consequence, the support pad includes a bite or junction between the central and outer portions, which junction is engaged by the lower end of the spring.

A primary object of this invention is a valving means for effectively sealing and readily opening a port in a flow passageway.

A further object is an improved diaphragm valve which permits the use of high unit pressure to seat the valve yet allow a small pressure differential to open the valve.

Another object is a novel valve which readily permits a diaphragm to engage a port with a uniform force all around the seating area.

Another object is a valve which prevents the escape of harmful fuel vapors from a fuel tank and is adapted to permit air to enter the tank as fuel is withdrawn.

Another object is a valve which is adapted to provide anti-siphon protection for a fuel system wherein at least one portion of the system is below the fuel level in the tank.

Another object is a reliable valve which may be economically manufactured and is generally insensitive to foreign particles.

Other objects and advantages will be apparent from the following description and accompanying drawings for the invention.

THE DRAWINGS

The invention is illustrated by the accompanying drawings wherein.

DETAILED DESCRIPTION

Figure 1:
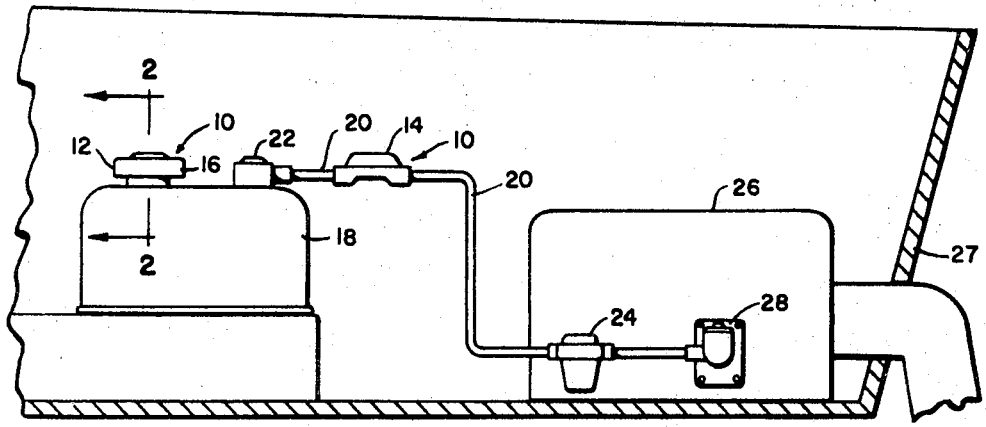
FIG. 1 is a side view of a fuel system for a marine propulsion unit.

Referring to the drawings in more detail, it will be seen that the diaphragm valve 10 (shown in FIG. 3) includes a housing 30 partially defining therein a flow passageway 32. The flow passageway 32 includes a port 36 surrounded by a valve seat 34. The port 36 separates the flow passageway into an upstream portion 35 and a downstream or outlet portion 37.

A diaphragm 42 is mounted within the housing 30 and cooperates with the housing to assist in completing the flow passageway 32. The diaphragm 42 is movable between a first position to close the port 36 and a second position to open the port. A spring 52 operates on the diaphragm 42 to move it to the first position thereby closing the port 36. Means are provided for subjecting the diaphragm 42 to pressure differentials between the upstream portion 35 and the downstream portion 37. Reduction in pressure in the downstream portion 37 as compared to the upstream portion is effective to overcome the spring 52 and displace the diaphragm to an open position allowing flow of fluid through the port 36.

The valve 10 is adapted for use in connection with fluid flow regulation. This encompasses a variety of uses in various environments and situations. Two examples of the many uses for the diaphragm valve 10 are shown and described in this application. FIG. 1 shows both of these uses wherein the diaphragm valve 10 is used as a vent valve 12 in a portable fuel tank and as an anti-siphon valve 14 in a fuel system.

As shown in FIG. 1, the vent valve 12 is placed in a cap 16 for a fuel tank 18 of the 3 or 6 gallon type adapted for marine use. The cap 16 may be secured to the tank 18 in any conventional manner such as a screw fit, an interference fit or a bayonet type fitting shown in FIG. 2. The vent valve 12 permits air to enter the tank 18 as fuel is withdrawn, in addition to preventing the escape of fuel vapors from the tank at all times.

This provides an important safety improvement substantially eliminating the chances of explosion due to escaping vapors.

The anti-siphon valve 14 is shown in a fuel line such as a flexible hose 20 wherein at least one portion of the fuel system is below the fuel level in the tank 18. The anti-siphon valve 14 may be placed in the fuel line between a fuel tank withdrawal assembly 22 and a fuel pump 24 mounted on a marine propulsion unit 26. The marine propulsion unit 26 is shown in FIG. 1 as mounted in the transom portion of a boat 27.

The fuel pump 24 delivers fuel from the tank 18 through the flexible hose 20 to a carburetor 28 on the marine propulsion unit. Any break in the fuel system below the tank fuel level such as a ruptured pump diaphragm, a carburetor float valve leak, or a broken hose would permit fuel to siphon from the tank 18 when the marine propulsion unit 26 is shut down. The anti-siphon valve 14 prevents this from occurring in the fuel system substantially reducing the chances of fire.

Figure 2:
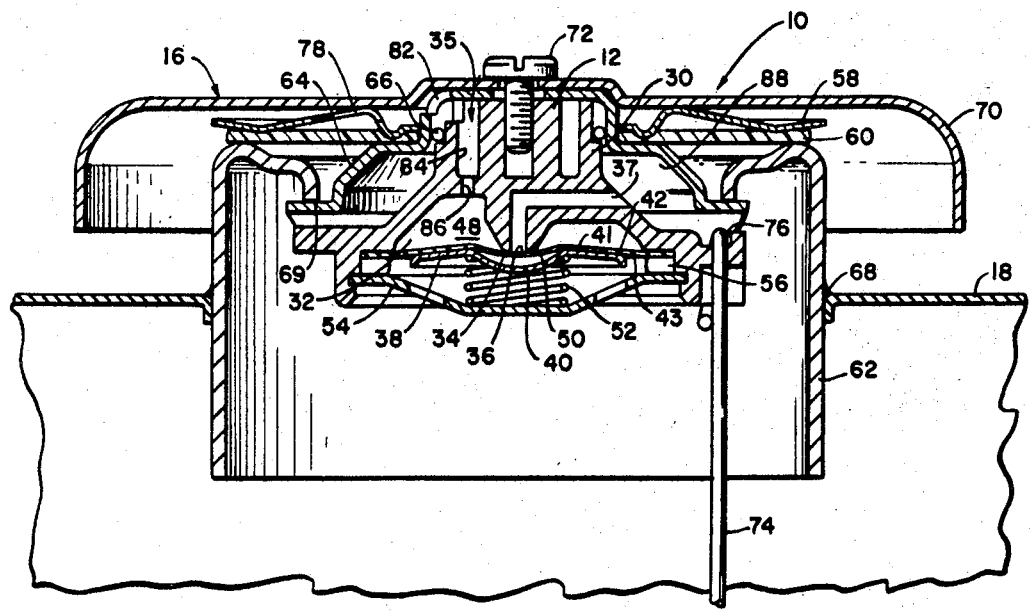
FIG. 2 is an enlarged section view of a diaphragm valve taken along line 2—2 in FIG. 1.

FIG. 2 is a detailed section view of the diaphragm valve 10 in use as a vent valve. The vent valve 12 may be mounted in the cap 16 as shown or in a separate housing in a fuel tank 18. The vent valve 12 includes a valve housing 30 which together with a diaphragm 42 defines a flow passageway 32. A valve seat 34 within the valve housing surrounds a port 36 for the flow passageway. The port 36 separates an upstream portion 35 of the flow passageway from a downstream portion 37.

The diaphragm 42 has a first side 41 and a second side 43 and is preferably a thin flexible membrane. The diaphragm includes a valve part 50 and may be made from any number of materials impervious to fluids such as fabric material, plastic, rubber or elastic synthetic materials having similar properties.

A movable support 38 engages the second side of the diaphragm 42. The support 38 preferably includes a cupped or depressed middle portion 40 which is aligned with the port 36. As shown in this embodiment, the support 38 is movable in response to movement of the diaphragm 42 to thereby open and close the port of the flow passageway.

A spring such as the spiral spring shown at 52 is supported by a retainer 54 and engages the movable support 38. In this manner the spring 52 forces the diaphragm 42 against the valve seat 34 to seal off the port 36. The port 36 is therefore sealed by a high unit pressure preventing the escape of harmful fuel vapors from within the tank 18, as well as halting the flow of air into the tank when desired.

In accordance with the invention, the interior of the fuel tank 18 is completely sealed from the atmosphere. Along with the impervious barrier of the diaphragm 42, a retainer or cover 54 supports a first gasket 56 and the diaphragm in sealing contact with the housing 30. An O-ring 66 or similar sealing member provides a tight closure between the valve housing 30 and a cup member 64. An annular diaphragm 58 preferably made from brass, provides a spring force on a second gasket 60 holding it in sealing contact with the cup member 64 and a filler neck portion 62. To help complete the seal for the interior of the tank 18 the filler neck portion 62 may be secured to the tank by any suitable means such as the spot weld shown at 68.

As previously mentioned the cap 16 may be secured to the tank 18 by a bayonet type fitting provided between the filler neck portion 62 and the cup member 64. Cup member 64 fits through a slot (not shown) in the filler neck portion 62. When the cup member 64 is rotated by turning a cover or lid 70 it will seal securely over a cam surface 69 provided by the filler neck portion.

The cover 70 may be held against the cup member 64 by any suitable means such as spot welding the two members together at any point where their respective surfaces are adjacent each other. A screw 72 or similar fastening means secures the valve housing 30 to the cup member 64. An anchor link 74 fits over a flange 76 on the valve housing and may be used to anchor the valve housing to the bottom of the tank.

The upstream portion 35 of the flow passageway is maintained at atmospheric pressure. This is accomplished by means of a series of openings through various members in the cap 16. An aperture 78 in the annular diaphragm 58 leading to the surrounding atmosphere lets air into a cavity. The air then passes through an opening 82 in the cup member 64 and into an annular groove 84 in the valve housing 30. From the annular groove 84 the air passes through an internal opening 86 in the housing 30 and into a chamber 48. The chamber 48 is defined by the housing 30 and the first side 41 of the diaphragm, and constitutes a part of the upstream passageway portion 35, and is thus continually maintained at atmospheric pressure.

As fuel is withdrawn from the tank 18, the internal pressure within the tank (i.e., a part of the downstream flow passageway 37) will decrease to below atmospheric pressure. This will cause a reduction in pressure operating over the entire surface area of the second side 43 of the diaphragm as the second diaphragm side 43 is open to the interior of the tank through several openings illustrated in FIG. 2. In addition, there will be a decrease in pressure operating over a relatively small area of the first side 41 of the diaphragm defined by the valve seat 34.

The spring 52 is designed in the absence of a pressure differential between the upstream and downstream passageway portions, to maintain the diaphragm 42 in port closing position and, when the internal pressure in the tank 18 reaches 6 to 8 inches of water below atmospheric pressure, to permit the diaphragm 42 to move away from the valve seat 34. This permits air to pass through the port 36 into the outlet or downstream passageway portion 37 and to continue into the tank 18 through an annular chamber 88 between the valve housing 30 and the cup member 64. Thus, the invention permits air to enter the tank 18 as fuel is withdrawn.

In accordance with the invention, the periphery of the diaphragm is supported between the retainer and the housing in a plane spaced below the valve seat as shown in FIG. 2 and the spring is designed with a diameter which exceeds the outer diameter of the valve seat and so as to locate the central portion of the diaphragm in the port closing position in the absence of a pressure differential between the upstream passageway portion and the downstream passageway portion. In addition, there is provided a support member or pad which is interposed between the spring and the diaphragm and which includes a central dished portion extending into the adjacent end of the spring and an outer portion extending from the periphery of the central portion and both axially and radially away from the valve seat. The central and outer portions of the support pad meet at a juncture which receives the lowermost coil of the spring and which has a diameter in excess of the outer diameter of the valve seat.

Figure 3:
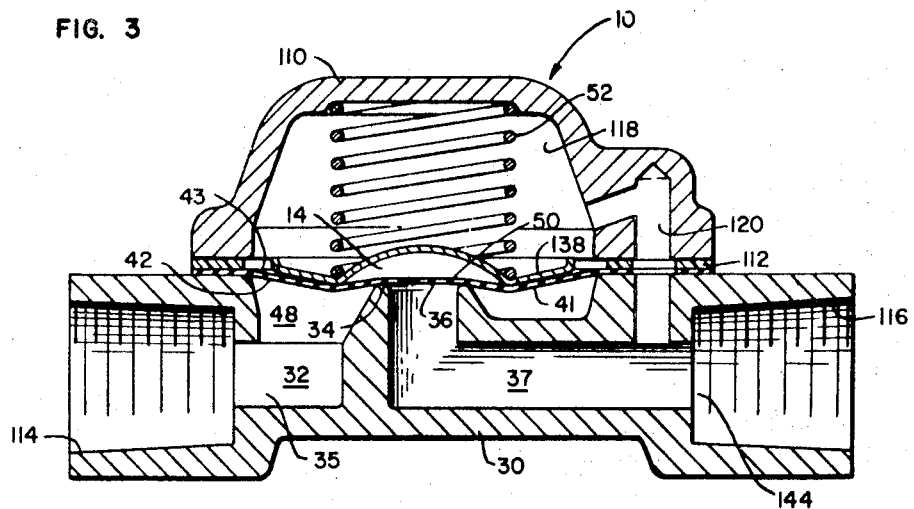
FIG. 3 is an enlarged section view of the invention in use as an anti-siphon valve.

FIG. 3 is a section view of the diaphragm valve 10 which can be employed as an anti-siphon valve 14 for a fuel system. The design of the anti-siphon valve 14 is substantially similar to the vent valve 12 shown in FIGS. 1 and 2.

The anti-siphon valve 14 has a valve housing 30 to which is connected a cover 110. A flexible diaphragm 42 is preferably supported between the cover 110 and the housing 30 in a plane spaced above the valve seat 34 and engages a support 38 and defines with the housing 30 a flow passageway 32. A port 36 separates the flow passageway into an upstream portion 35 and a downstream portion 37. A gasket 112 resting against the cover 30 holds the diaphragm 42 in sealing contact with the housing 30. A spring 52 engages the movable support 38 and forces a valve part 50 of the diaphragm against a valve seat 34 to seal off the port 36.

The upstream portion 35 of the flow passageway has an opening 114 for connecting to the flexible hose 20 as shown in FIG. 1. This portion of the hose leads to the fuel tank withdrawal assembly 22. An outlet 144 in the downstream portion 37 of the flow passageway includes an opening 116 for connecting to the downstream side of the flexible hose 20. This portion of the hose leads to the fuel pump 24 on the marine propulsion unit 26 also shown in FIG. 1.

A first chamber 48 defined by the valve housing 30 and the first side 41 of the diaphragm is subject to the pressure in the upstream passageway portion 35, and, in general, is maintained at a relatively constant pressure. A second chamber 118 is defined by the cover 110 and the second side 43 of the diaphragm. The action of the fuel pump 24 creates a vacuum and reduces the pressure in the second chamber 118 through an auxiliary passageway 120 in the outlet portion 144. This causes a reduction in pressure to operate over the entire surface area of the second side 43 of the diaphragm.

The spring 52 is designed so that, in the absence of a pressure differential between the upstream and downstream passageway portions 35 and 37, the diaphragm 42 will be located in the port closing position as shown in FIG. 3, and so that a predetermined pressure differential between the first side 41 and the second side 43, the closing action of the spring will be overcome and the diaphragm 42 with the support 38 will move away from the valve seat 34. This opens the port 36 to permit flow of fuel into the outlet portion 144 where it is free to flow through the flexible hose 20 to the fuel pump 24.

When there is a break in the fuel system, the pressure in the second chamber 118 will immediately increase as the fuel pump 24 will no longer create a vacuum and reduce the pressure in the second chamber. This causes the pressure differential working on opposite sides of the diaphragm 42 to diminish and the spring 52 will again take over to move the diaphragm back into contact with the valve seat 34. In this manner the port 36 will be closed preventing the siphoning of fuel from the tank 18.

In the embodiments shown in FIGS. 2 and 3 the spring 52 has a diameter which is substantially greater than the outer diameter of the valve seat 34. In addition, as also shown in FIG. 3, the valve seat 34 is located in a plane spaced from the plane of peripheral support of the diaphragm 41 between the housing 30 and the cover 110. In addition, at least a portion of the valve part 50 of the diaphragm is unsupported. As also fully illustrated in FIG. 3, the support 38 includes a dished or domed central portion which is located adjacent to the valve part 50 and which projects upwardly into the center of the lower end of the spring 52 to constitute an opening in the support 38, together with a conical portion which extends upwardly and outwardly from the periphery of the dome-shaped portion, whereby the lower end of the spring 52 is engaged with the support 38 at the annular portion or juncture between the conical portion and the dome-shaped portion. Upward projection of the dished support portion permits the valve part 50 of the flexible diaphragm to conform to the valve seat 34 with a uniform force all around the seating area with minimum regard to the squareness of the spring 52 with the valve seat. In other words, the spring 52 need not be at exact right angles to the valve seat 34 to accomplish a uniform sealing force at the port 36.

The spring 52 acts through the support 38 to bias the diaphragm 41 downwardly and around the outer portion or lip of the valve seat 34. More specifically, the force of the spring 52 is transferred to the diaphragm 41 through the support 38 so that the diaphragm 41 is tensioned by the support 38 in such manner as to minimize internal stresses in th diaphragm 41 and in such manner as to form the diaphragm 41 downwardly and around the outer portion or lip of the valve seat 34 to obtain a particularly good seal. As can be seen from FIG. 3, the diaphragm 41 is in engagement with the support 38, over a wide area, and, when the diaphragm 41 is in the port closing position, the part or portion of the diaphragm 41 immediately beneath the juncture of the conical and dome-shaped portions of the support 38 is located below the plane of the valve seat 34, thereby causing the valve part 50 of the diaphragm 41 to extend around and downwardly of the outer portion or lip of the valve seat 34.

Employment of the spring 52 with a substantially larger diameter than the outer diameter of the valve seat 34 permits effective operation without requiring precise alignment of the spring 52 with the valve seat 34 and, as already indicated, affords engagement with the valve seat 34 with a substantially uniform force around the area of engagement.

Still further, use of the illustrated support 38 serves to assist in displacement of the diaphragm 41 away from the valve seat 34 in response to a small pressure differential. More particularly, the conical portion of the support 38 acts, in effect, as an extension of, or as a piston at, the lower end of the spring 52, and consequently, the area of effective engagement between the diaphragm 41 and the spring 52 is greatly enlarged beyond that of mere circular engagement with the lowermost spring coil. Thus, when there is a reduction in pressure in the chamber 118, the diaphragm 41 can more effectively overcome the biasing action of the spring 52 and move from the port closing position. In this regard, use of the support 38 serves to reduce internal stress or tension in the diaphragm 41 by enlarging the area of effective engagement with the spring 52 and, in addition, because of the increased area of engagement between the diaphragm 41 and the support 38, there is afforded transmission to the spring 52 of greater force per increment of pressure decrease in the chamber 118 than would occur in response to direct engagement of the spring 52 with the diaphragm 41.

Figure 4:
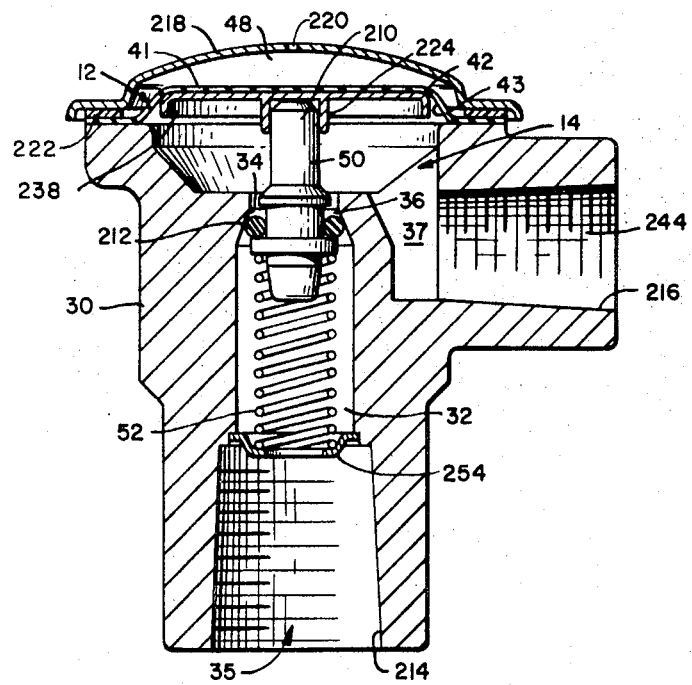
FIG. 4 is an enlarged section view of another embodiment of the invention.

Another embodiment of the anti-siphon valve 14 is shown in FIG. 4. A valve housing 30 defines in part a flow passageway 32. A valve seat 34 surrounds a port 36 for the flow passageway. The port 36 separates an upstream portion 35 of the flow passageway from a downstream portion 37. A flexible diaphragm 42 has a first side 41 and a second side 43. The second side of the diaphragm engages a movable support 238 and together with the housing completes the flow passageway 32.

In this embodiment a valve part 50 is in the form of a valve body 210. The valve body abuts the movable support 238 and is held in position by a downwardly extending flange 224. The valve body 210 rides in the valve seat 34 and is adapted to move up and down. A spring 52 mounted on a retainer 254 urges the valve body toward a closed position with the valve seat 34. An O-ring 212 or similar sealing member fits snugly around the valve body 210 and is adapted to engage the valve seat 34 in sealing contact with upward movement of the valve body 210.

The housing 30 includes a cover 218. A gasket 222 provides a seal between the cover 218 and the periphery of the diaphragm 42. A first chamber 48 is defined by the cover 218 and the first side 41 of the diaphragm. A vent 220 in the cover leads to the atmosphere and maintains the first chamber 48 at a substantially constant uniform pressure.

The upstream portion 35 of the flow passageway has an opening 214 for connecting to the flexible hose 20. That portion of the flexible hose leads to the fuel tank withdrawal assembly 22 shown in FIG. 1. An outlet 244 in the downstream portion 37 of the passageway has an opening 216 for connecting to that portion of the flexible hose 20 leading to the fuel pump 24. When the fuel pump is in operation, this maintains the outlet 244 at a pressure below atmospheric pressure. This pressure differential operating on opposite sides of the diaphragm overcomes the action of the spring 52 and moves the diaphragm 42, support 238 and valve body 219 to open the port 36.

In case of failure within the fuel system the outlet portion 244 will quickly reach atmospheric pressure eliminating the pressure differential working on opposite sides of the diaphragm 42. This will move the diaphragm 42, support 238 and valve body 210 up to close the port 36. In this manner flow of fluid through the anti-siphon valve 14 is controlled.

It should be noted that for all the embodiments of this invention a relatively constant uniform force operates on the majority of the surface area of the first side 41 of the diaphragm. A suction means which causes a reduction in the pressure in the downstream portion 37 of the flow passageway operates on the majority of the surface area of the second side 43 of the diaphragm. This causes a pressure differential on opposite sides of the diaphragm 42 which is effective to overcome the action of the spring 52 and thereby opens the port 36 to allow flow in the passageway 32.

Various features of the invention are set forth in the following claims.

We claim:

1. A valve for controlling flow in response to downstream pressure variation, said valve including a housing having means at least partially defining a flow passageway having a port surrounded by a valve seat, said port separating an upstream portion of said flow passageway from a downstream portion, a diaphragm supported by said housing, cooperating with said housing to define said flow passageway, and being movable relative to said port between a port closing position and a port opening position, said diaphragm including a first side subject to the pressure condition in said downstream passageway portion and a second side subject, in part, to the pressure condition in said upstream passageway portion, a spring having an end with a diameter larger than said valve seat, and a support member interposed between said diaphragm and said spring and including a central portion extending inwardly of the adjacent end of said spring in spaced relation to said diaphragm and an outer portion extending radially outwardly from the periphery of said central portion and engaged with said spring and said diaphragm, whereby to locate said diaphragm in said port closing position in the absence of a pressure differential between said upstream and downstream passageway portions, whereby, when said downstream passageway portion is subject to a pressure condition less than the pressure condition in said upstream portion, such pressure differential produces a first force which acts in opposition to said spring and so as to urge said diaphragm toward said port opening position, and whereby, when the pressure condition in said downstream passageway portion is higher than the pressure condition in said upstream passageway portion, such pressure differential produces a second force acting counter to said first force and in common with said spring so as to urge said diaphragm toward said port closing position.

2. A valve in accordance with claim 1 wherein said diaphragm is peripherally supported by said housing in a plane located in spaced relation from said valve seat in the direction away from said valve seat.

3. A valve in accordance with claim 1 and further including a cover connected to said housing in spaced relation from said valve seat and defining together with said diaphragm, a chamber located on the other side of said diaphragm from said valve seat and communicating with said downstream passageway.

4. A valve in accordance with claim 1 wherein said spring engages said support member at the juncture of said central portion and said outer portion.

5. A valve in accordance with claim 3 wherein the outer diameter of said central portion exceeds the outer diameter of said valve seat and the part of said diaphragm at the periphery of said central portion of said support member is located, under the influence of said spring and in the absence of a pressure differential between said upstream and downstream passageway portions, more remotely from said cover than said valve seat.

6. A valve in accordance with claim 1 in further combination with a fuel tank connected to said upstream passageway portion and an engine carburetor.

7. A valve in accordance with claim 1 in further combination with a fuel tank and a cap removably mounted on said tank in sealing engagement therewith and wherein said housing is carried by said cap and said downstream passageway portion communicates with the interior of said tank and said upstream passageway portion communicates with the atmosphere through passage means extending in said cap.

8. A valve for controlling flow in response to downstream pressure variation, said valve including a cover and a housing connected to said cover and having means at least partially defining a flow passageway having a port surrounded by a valve seat located in spaced relation from said cover, said port separating an upstream portion of said flow passageway from a downstream portion, a diaphragm peripherally supported between said housing and said cover and located between said housing and said cover so as to further define said flow passageway, and to define, in cooperation with said cover, a chamber in communication with said downstream passageway portion, said diaphragm being movable relative to said port between a port closing position and a port opening position, and including a first side subject to the pressure condition in said downstream passageway portion and a second side subject, in part, to the pressure condition in said upstream passageway portion, a diaphragm support member engaged with said diaphragm in an area located solely radially outwardly of said valve seat and including an annular portion engaged with said diaphragm and having a diameter larger than said valve seat, and a spring engaged between said cover and said annular portion of said support member so as to locate said diaphragm in said port closing position in the absence of a pressure differential between said upstream and downstream passageway portions, whereby, when said downstream passageway portion is subject to a pressure condition less than the pressure condition in said upstream portion, such pressure differential produces a force which acts in opposition to said spring and so as to urge said diaphragm toward said port opening position, and whereby, when the pressure condition in said downstream passageway portion is higher than the pressure condition in said upstream passageway portion, such pressure differential produces a second force acting counter to said first force and in common with said spring so as to urge said diaphragm toward said port closing position.

9. A valve in accordance with claim 8 wherein said diaphragm is peripherally supported between said housing and said cover in a plane located in spaced relation from said valve seat and toward said cover.

10. A valve in accordance with claim 8 wherein said support member includes a central portion extending from said annular portion toward said cover and in spaced relation to said diaphragm inwardly of the adjacent end of said spring and an outer portion extending radially outwardly from said annular portion and toward said cover.

11. A valve in accordance with claim 10 wherein said spring engages said support member at the juncture of said central portion and said outer portion.

12. A valve in accordance with claim 10 wherein the outer diameter of said central portion exceeds the outer diameter of said valve seat and the part of said diaphragm at the periphery of said central portion of said support member is located, under the influence of said spring and in the absence of a pressure differential between said upstream and downstream passageway portions, more remotely from said cover than said valve seat.

* * * * *